United States Patent
Sohn et al.

(10) Patent No.: US 10,564,744 B2
(45) Date of Patent: *Feb. 18, 2020

(54) FLEXIBLE DISPLAY DEVICE

(71) Applicant: LG Display Co., Ltd., Seoul (KR)

(72) Inventors: Min-Ho Sohn, Paju-si (KR); Sung-Jin Kang, Goyang-si (KR); Su-Jin Kwon, Seoul (KR); Yong-Kyun Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 170 days.

This patent is subject to a terminal disclaimer.

(21) Appl. No.: 15/246,132

(22) Filed: Aug. 24, 2016

(65) Prior Publication Data

US 2017/0060283 A1 Mar. 2, 2017

(30) Foreign Application Priority Data

Aug. 26, 2015 (KR) .................. 10-2015-0119945

(51) Int. Cl.
*G06F 3/041* (2006.01)

(52) U.S. Cl.
CPC .... *G06F 3/041* (2013.01); *G06F 2203/04102* (2013.01)

(58) Field of Classification Search
None
See application file for complete search history.

(56) References Cited

U.S. PATENT DOCUMENTS

| | | | | |
|---|---|---|---|---|
| 2004/0008191 A1* | 1/2004 | Poupyrev | ................ | G06F 3/011 345/184 |
| 2009/0172986 A1* | 7/2009 | Fuchsberg | .............. | G09F 9/372 40/610 |
| 2011/0001706 A1* | 1/2011 | Sanford | ................ | G06F 3/0412 345/173 |
| 2011/0199284 A1* | 8/2011 | Davis | ................ | G02B 26/0833 345/31 |
| 2013/0100053 A1* | 4/2013 | Kang | ........................ | G06F 3/03 345/173 |
| 2013/0265221 A1* | 10/2013 | Lee | .......................... | G06F 3/01 345/156 |
| 2015/0296607 A1* | 10/2015 | Yang | ....................... | G01L 1/205 361/750 |

FOREIGN PATENT DOCUMENTS

| | | |
|---|---|---|
| CN | 1696872 A | 11/2005 |
| CN | 101782804 A | 7/2010 |
| CN | 103365594 A | 10/2013 |
| CN | 104583905 A | 4/2015 |
| CN | 104779266 A | 7/2015 |
| KR | 10-2014-0132569 A | 11/2014 |

* cited by examiner

*Primary Examiner* — Jennifer Mehmood
*Assistant Examiner* — Parul H Gupta
(74) *Attorney, Agent, or Firm* — Seed Intellectual Property Law Group LLP

(57) ABSTRACT

Disclosed herein is a flexible display device having a bending sensor mounted in a layer that is tensioned or a layer that is compressed in order to increase the magnitude of voltage output from the bending sensor. The flexible display device includes at least two bending sensors mounted in a layer that is tensioned and/or a layer that is compressed when the flexible display device, including a plurality of layers, is bent.

22 Claims, 14 Drawing Sheets

| ANGLE | STRAIN [%] | R VARIATION | R1 [Ω] | R2 [Ω] | R3 [Ω] | R4 [Ω] | Vs [V] | V1 [mV] | V2 [V] | DOUT |
|---|---|---|---|---|---|---|---|---|---|---|
| -180 | -1.0% | -1.54% | 1476.9 | 1500.0 | 1500.0 | 1500.0 | 5 | 0.0194 | 0.97 | 394 |
| -90 | -0.5% | -0.77% | 1488.5 | 1500.0 | 1500.0 | 1500.0 | 5 | 0.0097 | 0.48 | 295 |
| 0 | 0.0% | 0.00% | 1500.0 | 1500.0 | 1500.0 | 1500.0 | 5 | 0.0000 | 0.00 | 196 |
| 90 | 0.5% | 0.77% | 1511.6 | 1500.0 | 1500.0 | 1500.0 | 5 | -0.0096 | -0.48 | 97 |
| 180 | 1.0% | 1.54% | 1523.1 | 1500.0 | 1500.0 | 1500.0 | 5 | -0.0191 | -0.96 | 0 |

| ANGLE | STRAIN | R VARIATION | R1 | R2 | R3 | R4 | Vs | V1 | V2 | DOUT |
|---|---|---|---|---|---|---|---|---|---|---|
| -180 | -0.01 | -1.54% | 1476.9 | 1500.0 | 1500.0 | 1476.9 | 5 | 0.0388 | 1.94 | 789 |
| -90 | -0.005 | -0.77% | 1488.5 | 1500.0 | 1500.0 | 1488.5 | 5 | 0.0193 | 0.97 | 589 |
| 0 | 0 | 0.00% | 1500.0 | 1500.0 | 1500.0 | 1500.0 | 5 | 0.0000 | 0.00 | 391 |
| 90 | 0.005 | 0.77% | 1511.6 | 1500.0 | 1500.0 | 1511.6 | 5 | -0.0192 | -0.96 | 195 |
| 180 | 0.01 | 1.54% | 1523.1 | 1500.0 | 1500.0 | 1523.1 | 5 | -0.0382 | -1.91 | 0 |

| | 1% | 1.54% | 1500 | | | 5 | | 50 | 1024 |
|---|---|---|---|---|---|---|---|---|---|
| ANGLE | STRAIN [%] | R VARIATION | R1 [Ω] | R2 [Ω] | R3 [Ω] | R4 [Ω] | Vs [V] | V1 [mV] | V2 [V] | DOUT |
| -180 | -1.0% | -1.54% | 1476.9 | 1500.0 | 1500.0 | 1500.0 | 5 | 0.0194 | 0.97 | 394 |
| -90 | -0.5% | -0.77% | 1488.5 | 1500.0 | 1500.0 | 1500.0 | 5 | 0.0097 | 0.48 | 295 |
| 0 | 0.0% | 0.00% | 1500.0 | 1500.0 | 1500.0 | 1500.0 | 5 | 0.0000 | 0.00 | 196 |
| 90 | 0.5% | 0.77% | 1511.6 | 1500.0 | 1500.0 | 1500.0 | 5 | -0.0096 | -0.48 | 97 |
| 180 | 1.0% | 1.54% | 1523.1 | 1500.0 | 1500.0 | 1500.0 | 5 | -0.0191 | -0.96 | 0 |

| | | | | | | | | 25 | 1024 |
|---|---|---|---|---|---|---|---|---|---|
| ANGLE | STRAIN | R VARIATION | R1 | R2 | R3 | R4 | Vs | V1 | V2 | DOUT |
| -180 | -0.01 | -1.54% | 1476.9 | 1523.1 | 1523.1 | 1476.9 | 5 | 0.0770 | 1.93 | 788 |
| -90 | -0.005 | -0.77% | 1488.5 | 1511.6 | 1511.6 | 1488.5 | 5 | 0.0385 | 0.96 | 591 |
| 0 | 0 | 0.00% | 1500.0 | 1500.0 | 1500.0 | 1500.0 | 5 | 0.0000 | 0.00 | 394 |
| 90 | 0.005 | 0.77% | 1511.6 | 1488.5 | 1488.5 | 1511.6 | 5 | -0.0385 | -0.96 | 197 |
| 180 | 0.01 | 1.54% | 1523.1 | 1476.9 | 1476.9 | 1523.1 | 5 | -0.0770 | -1.93 | 0 |

3.85

FLEXIBLE DISPLAY DEVICE

CROSS-REFERENCE TO RELATED APPLICATION(S)

This application claims the benefit of Korean Patent Application No. 10-2015-0119945, filed on Aug. 26, 2015, which is hereby incorporated by reference as if fully set forth herein.

BACKGROUND

Technical Field

The present disclosure relates to a flexible display device, and more particularly to a flexible display device having a bending sensor mounted in a layer that is tensioned or a layer that is compressed in order to increase the magnitude of voltage output from the bending sensor.

Description of the Related Art

Display technology for processing and displaying a large amount of information has rapidly grown. In addition, various kinds of display devices have been developed.

Examples of display devices include a liquid crystal display (LCD) device, a plasma display panel (PDP) device, a field emission display (FED) device, and an electroluminescent display (ELD) device. The thickness, weight, and power consumption of the display devices have been continuously reduced. However, it is difficult to manufacture the above-mentioned display devices such that the display devices are thin and flexible, since the display devices use a glass substrate, which withstands high temperatures generated in a manufacturing process.

For this reason, a flexible display device manufactured using a flexible material, such as a plastic film, which is foldable and unfoldable, in place of the conventional glass substrate, which has no flexibility, such that the flexible display device can be curved like paper while maintaining display performance has attracted attention as a next-generation flat panel display device in recent years. The flexible display device has advantages in that the flexible display device is thin, lightweight, impact resistance, and can be curved or bent so as to be folded or rolled for carrying. In addition, the flexible display device may be manufactured to have various forms. Consequently, future applicability of the flexible display device may be extended.

Flexible display devices have completed the testing phase, and mass-production of flexible display devices is imminent. It is expected that the flexible display device provides a new input and output interface different from electronic devices having conventional rigid displays, and it is also expected that newer user experiences may be provided through the new input and output interface.

In recent years, a device for sensing the shape of the flexible display device, configured such that a plurality of bending sensors is disposed at the edge of the flexible display device in order to sense the shape of the flexible display device, has been proposed (see Korean Patent Application Publication No. 10-2014-0132569).

FIG. 1 is a view showing a conventional flexible display device in which a plurality of bending sensors is disposed, and FIG. 2 is a view showing the construction of a conventional measurement unit. FIGS. 3A and 3B are views showing strain gauge circuits, and FIG. 4 is a block diagram showing the detailed construction of a microprocessor (MCU) of FIG. 2.

Referring to FIG. 1, bending sensors 101 and 102 for sensing bending of a flexible display device 100 are arranged along the edge of the flexible display device 100 at predetermined intervals.

Each of the bending sensors 101 and 102 may be a strain gauge. The strain gauge has a characteristic in that the resistance between terminals varies depending on physical tension (elongation) and compression (contraction). In order to sense the shape of the flexible display device 100 using the sensors, it is necessary to provide a measurement unit for signal processing. The measurement unit may be realized as shown in FIG. 2.

The conventional measurement unit may include a bridge circuit 210, an amplifier 220, and an analog to digital converter (ADC) 230.

The bridge circuit 210 is realized by a Wheatstone bridge, which includes one or more strain gauges. Since the resistance variation of each of the strain gauges is very small, the Wheatstone bridge is configured, as shown in FIG. 2, in order to convert resistance variation into voltage variation, which is amplified by the amplifier 220.

Meanwhile, the Wheatstone bridge may use a quarter-bridge circuit for sensing variation of a single strain gauge, as shown in FIG. 3A, or a half-bridge circuit for sensing variation of a pair of strain gauges, one of which is tensioned and the other of which is compressed, as shown in FIG. 3B. That is, in the case in which strain gauges are mounted to opposite surfaces of the flexible display device 100 at the positions at which the bending sensors 101 and 102 are disposed, the strain gauges may sense tensile strain and compressive strain. Consequently, the sensitivities of the sensors are improved.

Meanwhile, in the case in which the bridge circuit 210 of FIG. 2 is configured as a quarter-bridge circuit 320a shown in FIG. 3A, the quarter-bridge circuit 320a may be constituted by resistors R1, R2, R3, and one strain gauge 330a. When power from a power source 310 is distributed to the respective resistors, the amplitude of voltage output from the bridge circuit varies depending on the resistance variation of the strain gauge 330a.

On the other hand, in the case in which the bridge circuit 210 of FIG. 2 is configured as a half-bridge circuit 320b shown in FIG. 3B, the half-bridge circuit 320b may be constituted by R1, R3, and two strain gauges 330b and 330c. When power from a power source 310 is distributed to the respective resistors, the amplitude of voltage output from the bridge circuit varies depending on the resistance variations of the strain gauges 330b and 330c. The shape of the flexible display device is sensed based on the value of the voltage output from the bridge circuit.

The voltage output from the bridge circuit 210 is input to the amplifier 220, by which a small value of voltage is amplified into a large value of voltage. The amplified voltage is input to the analog to digital converter 230. The analog to digital converter 230 converts an analog signal into a digital signal, which is output to a microprocessor 240. The microprocessor (MCU) 240 determines the shape of the flexible display device 100 based on the values sensed by the sensors.

The detailed construction of the microprocessor 240 is shown in FIG. 4.

That is, the microprocessor 240 includes an input 401, a noise filter 402, a channel compensator 403, a curve point detector 404, a gain controller 405, a bending line detector 406, a slope compensator 407, and a feature extractor 408.

The noise filter 402 filters the change of a sensor value (e.g., provided at the input 401) due to factors other than the bending of the flexible display device 100 from a meaningful signal.

The channel compensator 403 compensates for the deviation between the sensors disposed at the flexible display device 100. In addition, the channel compensator 403 may compensate for the deviation between different sensors used in flexible display devices 100.

The curve point detector 404 analyzes values (for example, voltage values) sensed by the sensors 101 and 102 arranged in a line along each side (i.e., each edge) of the flexible display device 100 to extract the position and feature of a curve point formed at each edge (i.e., each outer region) of the flexible display device 100.

Upon determining based on the value output from the curve point detector 404 that the values output from the sensors 101 and 102 are less than a predetermined reference value or deviate from an input range of the analog to digital converter 230, and therefore it is necessary to control the gain of the amplifier 220 (for example, a variable gain amplifier), the gain controller 405 generates and provides an appropriate gain control signal to the amplifier 220.

Meanwhile, information about curve points detected from outer regions 110, 111, 112, and 113 by the curve point detector 404 is input to the bending line detector 406 in order to be used to determine the shape of the flexible display device 100.

The slope compensator 407 compensates for information about bending of bending lines based on information about slope of the bending lines.

The feature extractor 408 extracts and transmits the position, slope, angle, thickness, and direction of the detected bending lines to an upper layer.

However, the device and method for sensing the bending of the flexible display device have the following problems.

First, in the conventional flexible display device, the bending sensors are attached to the surface of the flexible display device. As a result, it is not possible to accurately sense overall deformation of the flexible display device. In addition, it is not possible to accurately measure stress and strain in layers of the flexible display device and to estimate deterioration of the flexible display device over time and depending on environments.

The reason for this is that the thickness of the conventional strain gauges is about 75 μm (in case of commercial products) and a special bonding agent has a thickness of several tens of μm in order to bond the strain gauges to the flexible display device 100 (e.g., to a surface of the flexible display device 100). In the case in which the thickness of the strain gauges is reduced like the flexible display device, the elasticity of the strain gauges, rather than the elasticity of the flexible display device 100, is critical, with the result that it is not possible to accurately sense the deformation of the flexible display device 100.

In addition, the special bonding agent, provided between the flexible display device 100 and the strain gauges, has a different coefficient of elasticity than the flexible display device 100 (e.g., a surface of the flexible display device 100). In addition, the special bonding agent has viscosity in addition to elasticity. Even when the flexible display device 100 is linearly deformed, therefore, the values measured by the strain gauges are not linear.

Second, in the case in which the bridge circuit is configured as the half-bridge circuit shown in FIG. 3B, two bending sensors (two strain gauges) must be in states of being tensioned and compressed. In this case, design of the system may be restricted.

Third, in the conventional flexible display device, the bending sensors are attached to the surface of the flexible display device. As a result, it is necessary to form a routing line for transmitting a signal output from each bending sensor through an additional process, or an additional flexible printed circuit (FPC) is required, whereby production costs are increased.

BRIEF SUMMARY

Accordingly, the present disclosure is directed to a flexible display device that substantially obviates one or more problems due to limitations and disadvantages of the related art.

In one or more embodiments, the present disclosure provides a flexible display device having at least two bending sensors, which are mounted in a bending region of a layer that is tensioned and in a bending region of a layer that is compressed, are mounted only in a bending region of a layer that is tensioned, or are mounted only in a bending region of a layer that is compressed, in order to increase the magnitude of voltage output from each of the bending sensors.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the embodiments particularly pointed out in the written description and claims hereof as well as the appended drawings.

To achieve these objects and other advantages and in accordance with the purpose of the disclosure, as embodied and broadly described herein, a flexible display device includes at least two bending sensors mounted in a layer that is tensioned and/or a layer that is compressed when the flexible display device, including a plurality of layers, is bent.

One bending sensor may be mounted in the layer that is tensioned, and one bending sensor may be mounted in the layer that is compressed.

In this case, signals detected by the at least two bending sensors may be output through a bridge circuit, and the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein at least one bending sensor mounted in the layer that is tensioned may be constituted by R1 and one bending sensor mounted in the layer that is compressed may be constituted by R2, or at least one bending sensor mounted in the layer that is compressed may be constituted by R1 and one bending sensor mounted in the layer that is tensioned may be constituted by R2.

In another example, at least one bending sensor mounted in the layer that is tensioned may be constituted by R3 and one bending sensor mounted in the layer that is compressed may be constituted by R4, or at least one bending sensor mounted in the layer that is compressed may be constituted by R3 and one bending sensor mounted in the layer that is tensioned may be constituted by R4.

In another example, at least one bending sensor mounted in the layer that is tensioned may be constituted by R1 and one bending sensor mounted in the layer that is compressed may be constituted by R3, or at least one bending sensor mounted in the layer that is compressed may be constituted by R1 and one bending sensor mounted in the layer that is tensioned may be constituted by R3.

In a further example, at least one bending sensor mounted in the layer that is tensioned may be constituted by R2 and one bending sensor mounted in the layer that is compressed may be constituted by R4, or at least one bending sensor mounted in the layer that is compressed may be constituted by R2 and one bending sensor mounted in the layer that is tensioned may be constituted by R4.

Two bending sensors may be mounted in the layer that is tensioned.

In this case, signals detected by the two bending sensors may be output through a bridge circuit, and the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein the two bending sensors may be constituted by R1 and R4, or the two bending sensors may be constituted by R2 and R3.

Two bending sensors may be mounted in the layer that is compressed.

In this case, signals detected by the two bending sensors may be output through a bridge circuit, and the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein the two bending sensors may be constituted by R1 and R4, or the two bending sensors may be constituted by R2 and R3.

Two bending sensors may be mounted in the layer that is tensioned, and two bending sensors may be mounted in the layer that is compressed.

In this case, signals detected by the four bending sensors may be output through a bridge circuit, and the bridge circuit may include a first connection unit, in which R1 and R3 are coupled to each other in series via a first load, and a second connection unit, in which R2 and R4 are coupled to each other in series via a second load, disposed between opposite ends of a power source, the first connection unit and the second connection unit being coupled to each other in parallel, and output terminals being provided at the first load and the second load, wherein the two bending sensors mounted in the layer that is tensioned may be constituted by R1 and R4 and the two bending sensors mounted in the layer that is compressed may be constituted by R2 and R3, or the two bending sensors mounted in the layer that is compressed may be constituted by R1 and R4 and the two bending sensors mounted in the layer that is tensioned may be constituted by R2 and R3.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 3A and 3B are views showing conventional strain gauge circuits, wherein FIG. 3A is a view showing a quarter-bridge circuit, and FIG. 3B is a view showing a half-bridge circuit;

FIG. 14(b) is a table showing resistance variations and output voltages of resistors depending on bending angles when the conventional bridge circuit of FIG. 3A is used, and FIG. 14(c) is a table showing resistance variations and output voltages of resistors depending on bending angles measured using the circuit shown in FIG. 14(a); FIG. 15(b) is a table showing resistance variations and output voltages of resistors depending on bending angles when the conventional bridge circuit of FIG. 3A is used, and FIG. 15(c) is a table showing resistance variations and output voltages of resistors depending on bending angles measured using the circuit shown in FIG. 15(a).

DETAILED DESCRIPTION

Reference will now be made in detail to the preferred embodiments of the present disclosure, examples of which are illustrated in the accompanying drawings.

Figure 5:
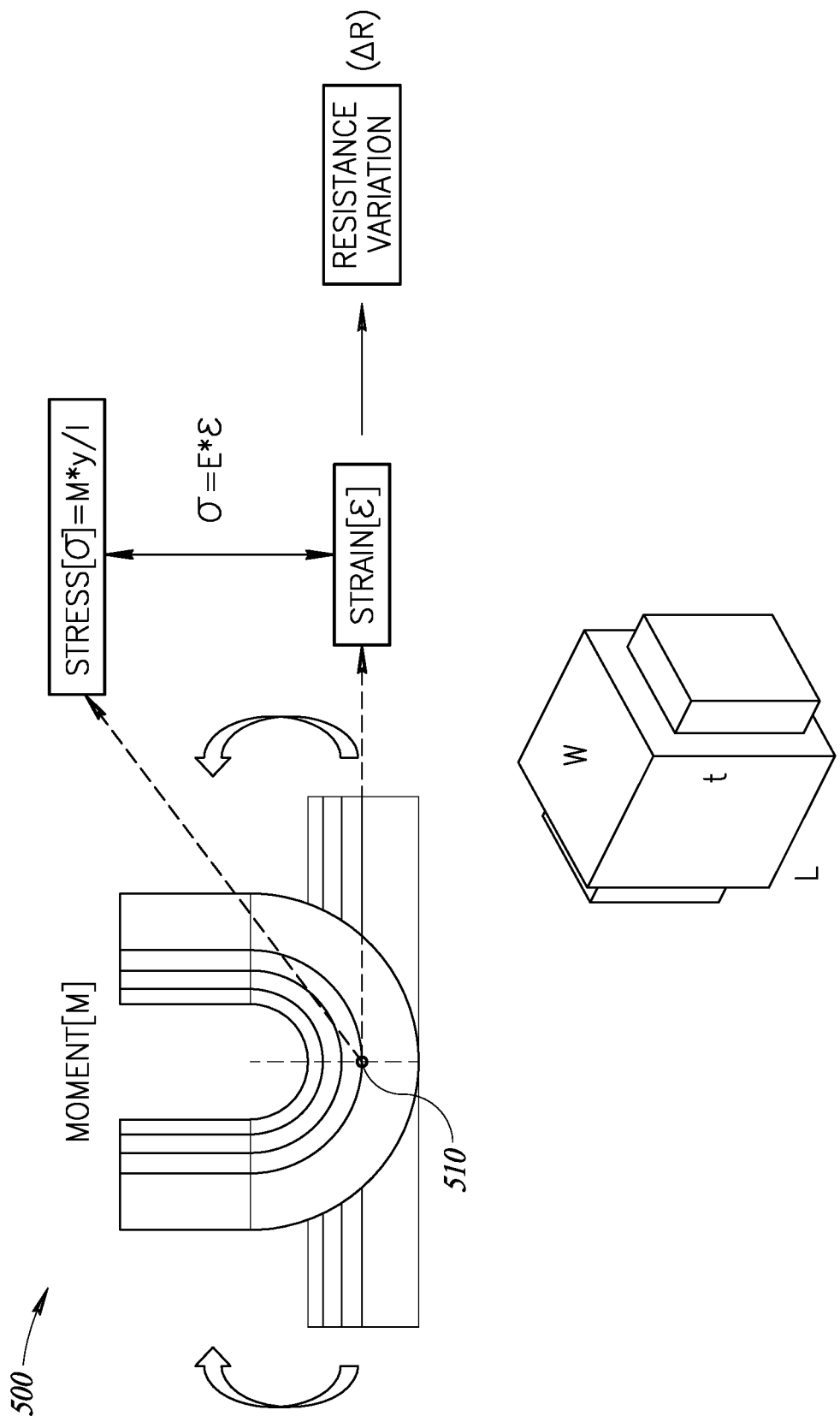
FIG. 5 is a view illustrating the principle of sensing bending of a flexible display device according to the present disclosure.
Figure 6:
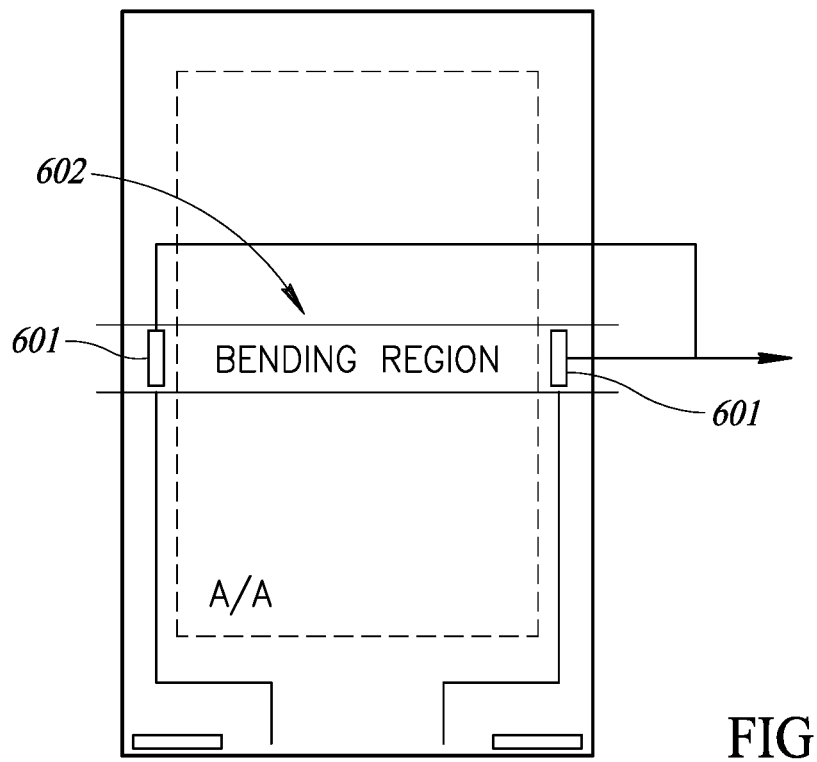
FIG. 6 is a view illustrating the case in which a bending sensor is mounted in one side or each side of a bending region of the flexible display device according to one or more embodiments of the present disclosure.

FIG. 5 is a view illustrating principles of sensing bending of a flexible display device according to the present disclosure, and FIG. 6 is a view illustrating the case in which a bending sensor is mounted in one side or each side of a bending region of the flexible display device according to the present disclosure. A sensor which senses bending of a device can be referred to as either a bend sensor or a bending sensor, both being used herein to have the same meaning.

As shown in FIG. 5, when the flexible display device 500 is bent, stress σ and strain ε are generated on a curve point 510 of the display device 500. The stress σ and the strain ε are proportional to each other, as shown by the following equations:

$$Stress[\sigma]=M*y/I;$$

$$\sigma=E*\varepsilon,$$

where: y=distance from neutral plane, I=Moment of Inertia, E=Young's modulus, and $v=(d\varepsilon_{trans}/d\varepsilon_{axial})=0.334$.

The resistance (R) of a material (e.g., a bending sensor in the flexible display device 500) at the curve point 510 varies as the flexible display device 500 is tensioned and/or compressed, according to the following equation: $R=(\rho/t)*(L/W)$, where ρ=resistivity, L=length, W=width and t=thickness.

When the flexible display device 500 is bent, the thickness t, the width W, and the length L of the curve point 510 are changed based on the strain ε.

When the flexible display device 500 is tensioned, the width W and the thickness t of the curve point 510 are decreased, and the length L of the curve point 510 is increased, whereby the resistance R is increased. When the flexible display device 500 is compressed, the width W and the thickness t of the curve point 510 are increased, and the length L of the curve point 510 is decreased, whereby the resistance R is decreased.

In a flexible display device 600 according to one or more embodiments of the present disclosure, as shown in FIG. 6, a bending sensor 601 is mounted in one side or each side of a bending region 602 of the flexible display device 600. The bending sensors 601 may be provided outside of a display area (A/A) of the flexible display device 600, as shown.

Figure 7A:
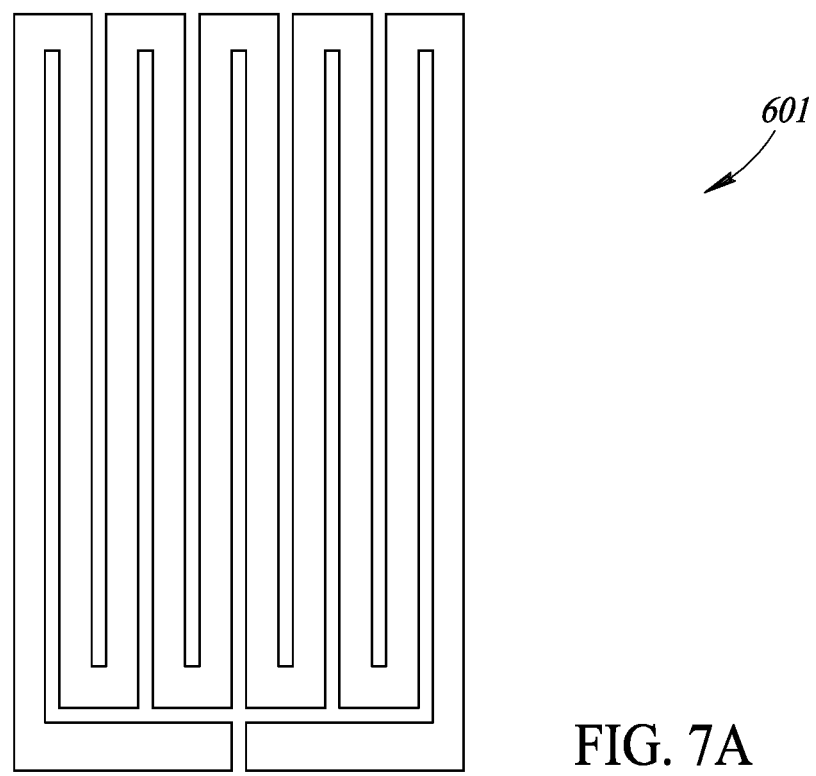
FIG. 7A is a view illustrating the bending sensor mounted in the flexible display device according to the present disclosure.
Figure 7B:
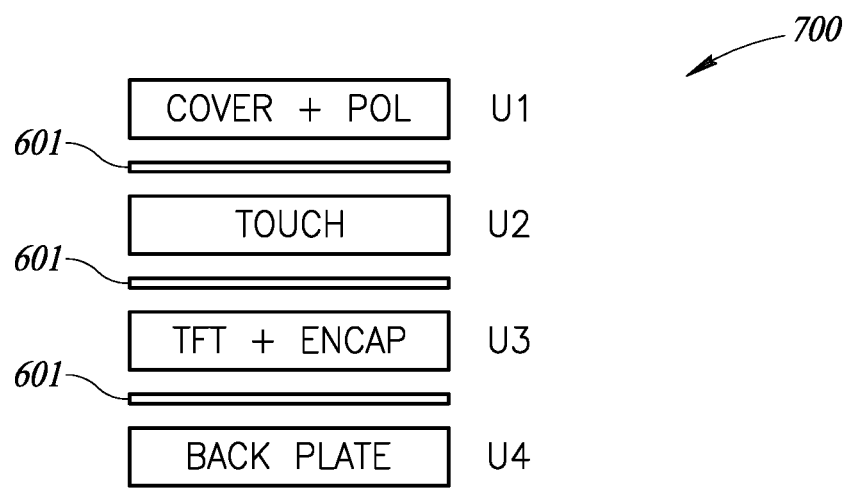
FIG. 7B is a view illustrating the position at which the bending sensor according to one or more embodiments of the present disclosure is mounted in the flexible display device.

FIG. 7A is a view illustrating a bending sensor 601, which may be mounted in the flexible display device according to embodiments of the present disclosure, and FIG. 7B is a view illustrating positions at which the bending sensor 601 according to embodiments of the present disclosure may be mounted in a flexible display device 700.

As shown in FIG. 7A, a bending sensor 601 according to one or more embodiments of the present disclosure is made of a conductive material having electrical resistance. The resistance value of the bending sensor 601 varies depending upon the bending extent (the bending angle) of the bending sensor 601.

In addition, as shown in FIG. 7B, a flexible display device 700 according to one or more embodiments of the present disclosure includes a plurality of films (layers U1 to U4), such as a back plate layer (Back plate U4), a pixel array layer (TFT+Encap U3), a touch sensor layer (Touch U2), and a cover plate layer (Cover+Pol U1).

Since the flexible display device 700 includes a plurality of films as described above, some of the films (layers) in the bending region 602 (shown in FIG. 6) are tensioned, and some of the films (layers) in the bending region 602 are compressed. Since some of the films (layers) in the bending region 602 are tensioned, and some of the films (layers) in the bending region 602 are compressed, as described above, the bending sensor 601 is mounted in the bending region 602. Specifically, the bending sensor 601 is mounted in at least one of the pixel array layer (TFT+Encap U3), the touch sensor layer (Touch U2), and the cover plate layer (Cover+Pol U1), shown in FIG. 7B, which will be described in more detail as follows. While the bending sensors 601 are shown in FIG. 7B as being provided between layers, in one or more embodiments, the bending sensors 601 may be provided on or formed within one or more of the layers U1 to U3.

Figure 8A:
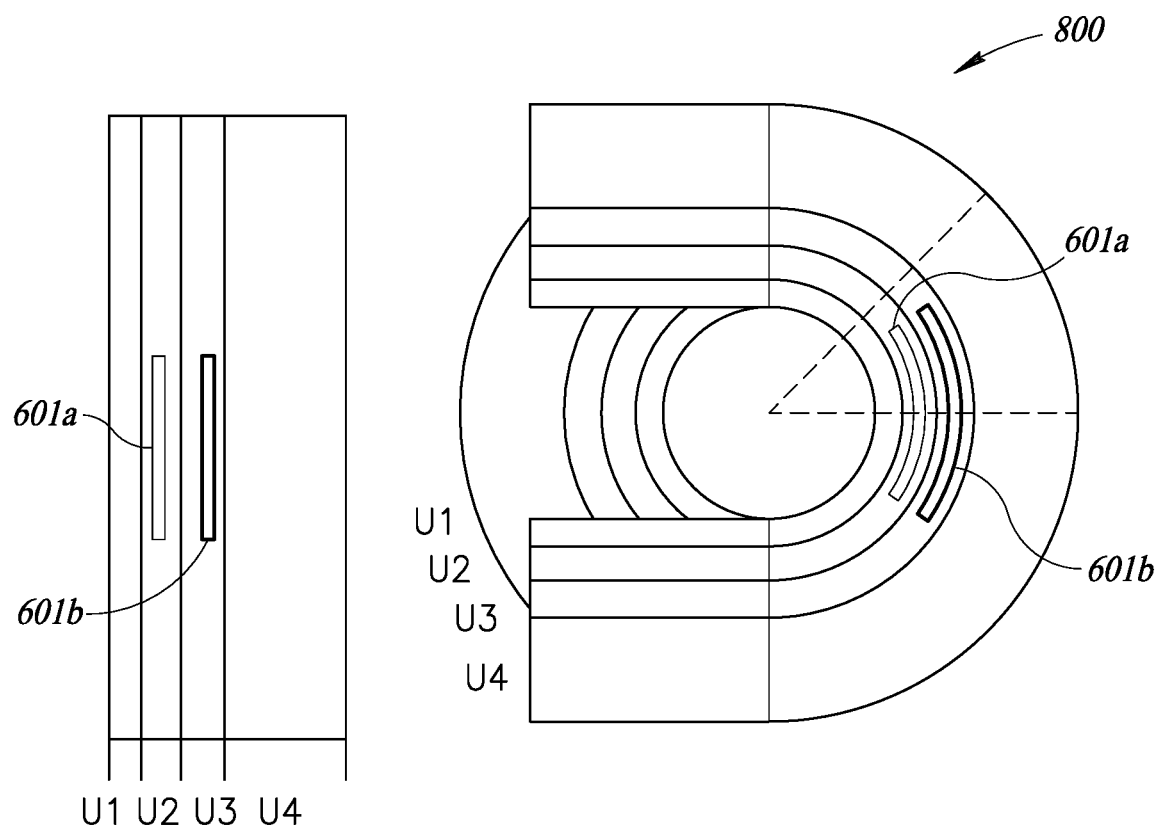
FIG. 8A is a view illustrating bending of the flexible display device in the bending region.
Figure 8B:
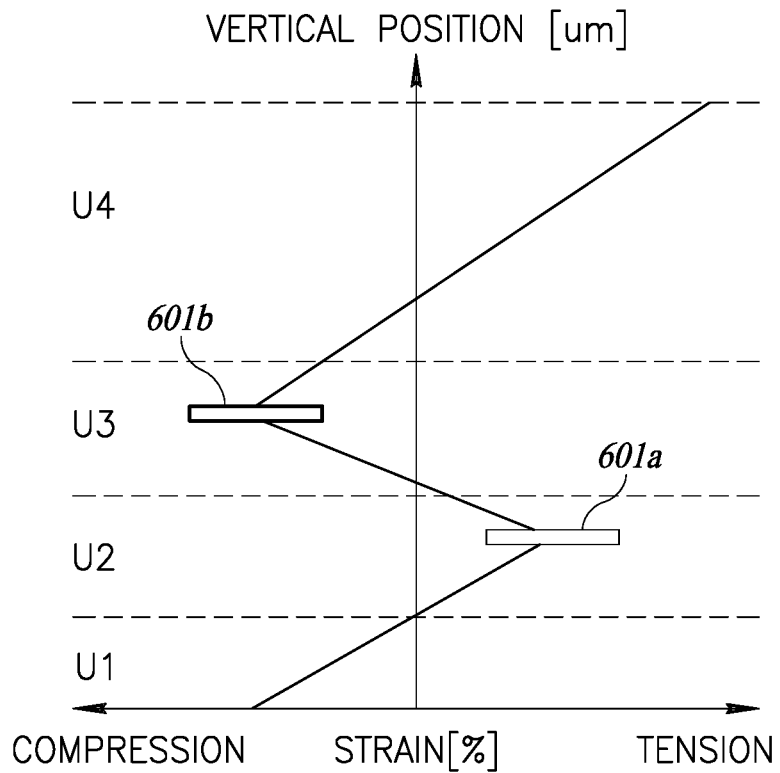
FIG. 8B is a plot illustrating the relationship between tension and compression in the layers of the flexible display device of FIG. 8A according to embodiments of the present disclosure.

FIGS. 8A and 8B illustrate the relationship between tension and compression in the bending region of a flexible display device 800 according to one or more embodiments of the present disclosure.

As described above, the flexible display device 800 includes a plurality of films (layers). Specifically, the flexible display device 800 includes four films U1, U2, U3, and U4, as shown in FIG. 8A. When the flexible display device 800 is bent, therefore, the tensile strain depth and the compressive strain depth of the bending region in the depth direction differ from each other.

Referring to FIG. 8A, when the flexible display device 800 is bent toward the first film U1, the third film U3 is compressed, and the second film U2 is tensioned.

In the flexible display device 800, therefore, two bending sensors (strain gauges) 601a, 601b are mounted in one side of the bending region 602 shown in FIG. 6. Alternatively, one bending sensor (strain gauge) 601 may be mounted in each side of the bending region 602. In this case, one of the bending sensors 601b is mounted in the third film U3, which is compressed, as described with reference to FIG. 8B, and the other bending sensor 601a is mounted in the second film U2, which is tensioned, as described with reference to FIG. 8B.

Figures 9A, 9B:
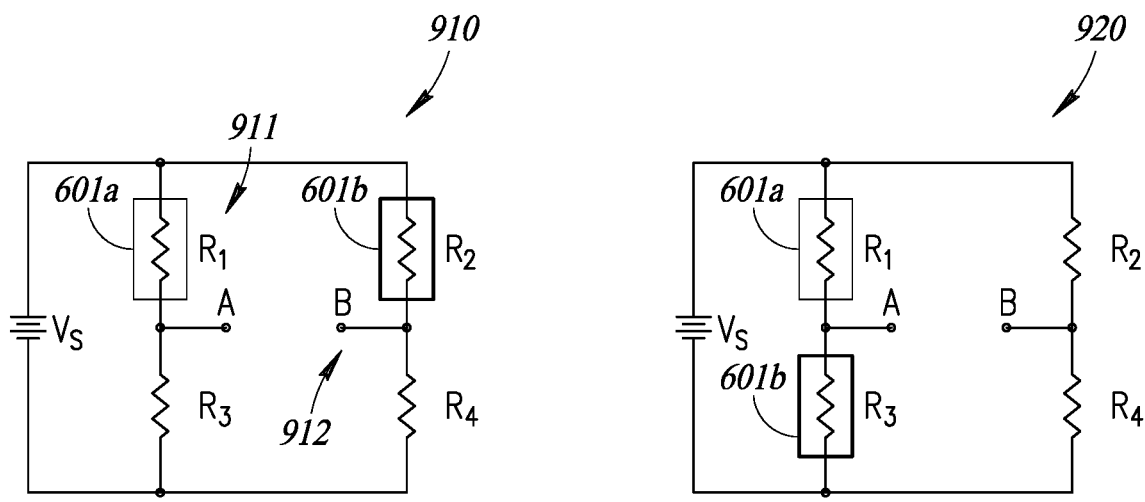
FIG. 9A is a view showing the construction of a bridge circuit of a flexible display device according to one or more embodiments of the present disclosure.
FIG. 9B is a view showing the construction of a bridge circuit of the flexible display device according to another embodiment of the present disclosure.

FIG. 9A is a view showing a bridge circuit 910 of a flexible display device according to one or more embodiments of the present disclosure, and FIG. 9B is a view showing a bridge circuit 920 of a flexible display device according to another embodiment of the present disclosure.

In a flexible display device according embodiments of the present disclosure, a bridge circuit 910 includes two bending sensors (strain gauges) 601a, 601b and two reference resistors R3 and R4, as shown in FIG. 9A.

That is, one bending sensor (strain gauge) 601b mounted in the third film U3, which is compressed, as described with reference to FIG. 8, corresponds to R2 shown in FIG. 9A, and the other bending sensor (strain gauge) 601a mounted in the second film U2, which is tensioned, corresponds to R1 shown in FIG. 9A.

That is, a bridge circuit 910 includes a first branch 911, in which the bending sensor 601*a* and resistor R3 are coupled to each other in series via a first load, and a second branch 912, in which the bending sensor 601*b* and resistor R4 are coupled to each other in series via a second load, disposed between opposite ends of a power source (V$_s$), wherein the first branch 911 and the second branch 912 are coupled to each other in parallel, and output terminals A and B are formed at the first load and the second load, respectively, is characterized in that one bending sensor (strain gauge) 601*a* mounted in the second film U2, which is tensioned, is constituted by R1, and the other bending sensor (strain gauge) 601*b* mounted in the third film U3, which is compressed, is constituted by R2.

In the case in which the bridge circuit is configured as shown in FIG. 9A, the voltage value V$_{AB}$ between the terminals A and B is as follows.

$$V_{AB}=[R3/(R1+R3)-R4/(R2+R4)]\times Vs \qquad \text{[Equation 1]}$$

Vs is a voltage of the power source. R1 (i.e., the bending sensor 601*a*) is a bending sensor for sensing tensile strain, and therefore the resistance of R1 is increased. R2 (i.e., the bending sensor 601*b*) is a bending sensor for sensing compressive strain, and therefore the resistance of R2 is decreased. Consequently, the output voltage of the bridge circuit 910 according to embodiments of the present disclosure is equivalent to twice that of the conventional bridge circuit shown in FIG. 3A.

In the bridge circuit 910 of FIG. 9A, the bending sensors 601*a*, 601*b* may be reversed in position with respect to one another, such that one bending sensor (strain gauge) 601*b* mounted in the third film U3, which is compressed, may be constituted by R1, and the other bending sensor (strain gauge) 601*a* mounted in the second film U2, which is tensioned, may be constituted by R2.

Furthermore, in the bridge circuit 910 of FIG. 9A, the bending sensors 601*a*, 601*b* may be reversed with respect to the resistors R3 and R4, such that one bending sensor (strain gauge) 601*b* mounted in the third film U3, which is compressed, may be constituted by R3, and the other bending sensor (strain gauge) 601*a* mounted in the second film U2, which is tensioned, may be constituted by R4. Alternatively, one bending sensor (strain gauge) 601*b* mounted in the third film U3, which is compressed, may be constituted by R4, and the other bending sensor (strain gauge) 601*a* mounted in the second film U2, which is tensioned, may be constituted by R3.

That is, the resistances of the resistors R3 and R4 vary (i.e., when the bending sensors 601*a*, 601*b* are provided as the resistors R3, R4, respectively), and therefore Equation 1 is represented as follows: V$_{AB}$=[R3/(R1+R3)−R4/(R2+R4)]×Vs. Consequently, the output voltage of the bridge circuit according to the present disclosure is equivalent to twice that of the conventional bridge circuit shown in FIG. 3A.

Meanwhile, in a flexible display device 920 according to another embodiment of the present disclosure, a bridge circuit 920 includes two bending sensors (strain gauges) 601*a*, 601*b* and two reference resistors R2 and R4, positioned as shown in FIG. 9B.

That is, one bending sensor (strain gauge) 601*b* mounted in the third film U3, which is compressed, as described with reference to FIG. 8, corresponds to R3 shown in FIG. 9B, and the other bending sensor (strain gauge) 601*a* mounted in the second film U2, which is tensioned, corresponds to R1 shown in FIG. 9B.

In the case in which the bridge circuit 920 is configured as shown in FIG. 9B, the voltage value V$_{AB}$ between the terminals A and B is as represented in [Equation 1].

$$V_{AB}=[R3/(R1+R3)-R4/(R2+R4)]\times Vs$$

R3 (i.e., the bending sensor 601*b*) is a bending sensor for sensing compressive strain, and therefore the resistance of R3 is decreased. R1 (i.e., the bending sensor 601*a*) is a bending sensor for sensing tensile strain, and therefore the resistance of R1 is increased. Consequently, the output voltage of the bridge circuit 920 according to embodiments of the present disclosure is equivalent to twice that of the conventional bridge circuit shown in FIG. 3A.

In the bridge circuit 920 of FIG. 9B, the bending sensors 601*a*, 601*b* may be reversed in position with respect to one another, such that one bending sensor (strain gauge) 601*b* mounted in the third film U3, which is compressed, may be constituted by R1, and the other bending sensor (strain gauge) 601*a* mounted in the second film U2, which is tensioned, may be constituted by R3.

Furthermore, in the bridge circuit 920 of FIG. 9B, the bending sensors 601*a*, 601*b* may be reversed with respect to the resistors R2 and R4, such that one bending sensor (strain gauge) 601*b* mounted in the third film U3, which is compressed, may be constituted by R2, and the other bending sensor (strain gauge) 601*a* mounted in the second film U2, which is tensioned, may be constituted by R4. Alternatively, one bending sensor (strain gauge) 601*b* mounted in the third film U3, which is compressed, may be constituted by R4, and the other bending sensor (strain gauge) 601*a* mounted in the second film U2, which is tensioned, may be constituted by R2.

That is, the resistances of the resistors R2 and R4 vary (i.e., when the bending sensors 601*a*, 601*b* are provided as the resistors R2, R4, respectively), and therefore Equation 1 is represented as follows: V$_{AB}$=[R3/(R1+R3)−R4/(R2+R4)]×Vs. Consequently, the output voltage of the bridge circuit according to the present disclosure is equivalent to twice that of the conventional bridge circuit shown in FIG. 3A.

Figure 10A:
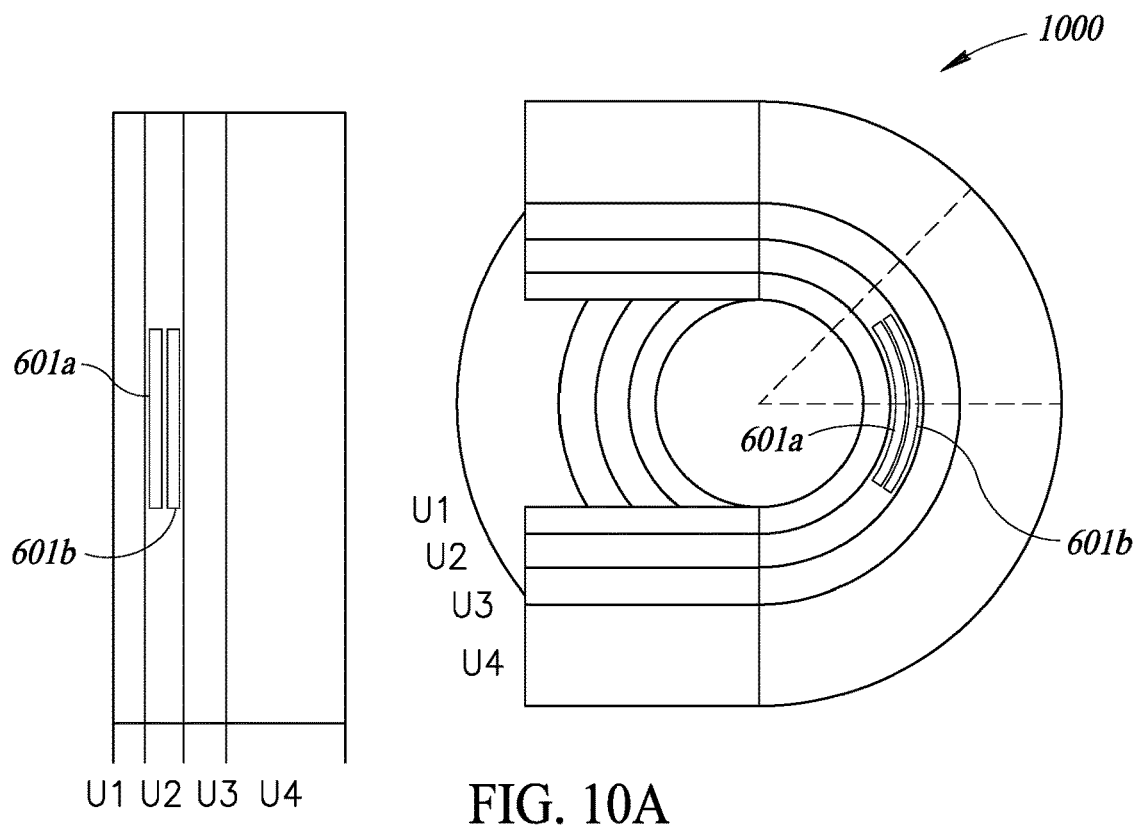
FIG. 10A is a view illustrating bending of a flexible display device according to embodiments of the present disclosure.
Figure 10B:
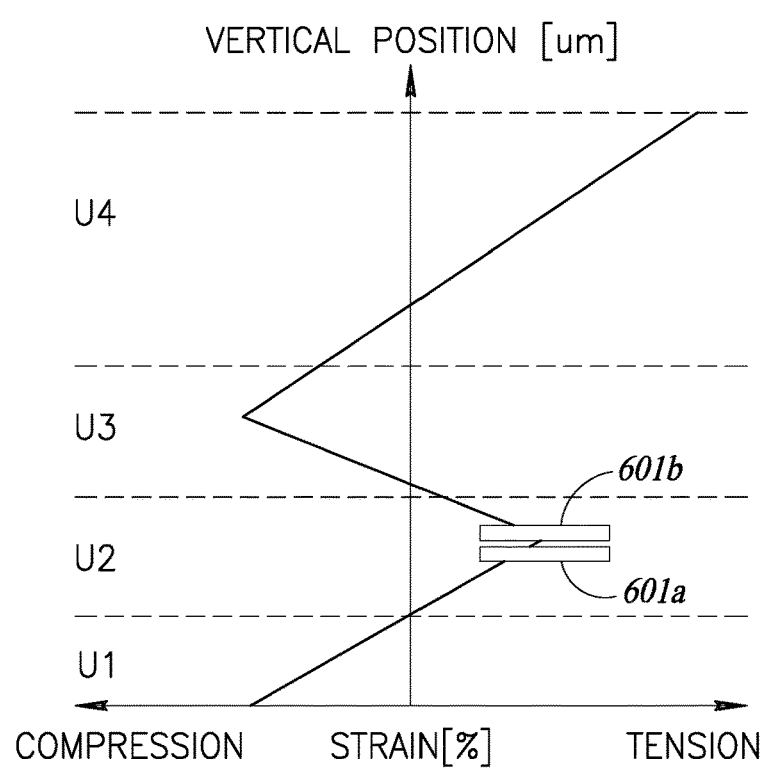
FIG. 10B is a plot illustrating the relationship between tension and compression in the layers of the flexible display device of FIG. 10A.
Figure 11:
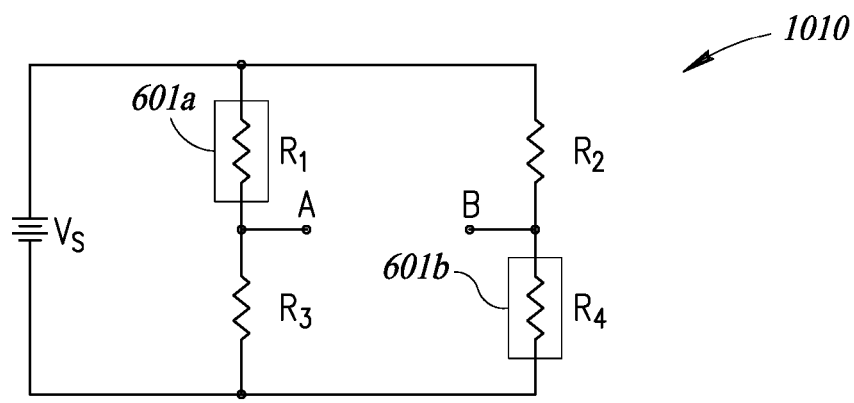
FIG. 11 is a view showing the construction of a bridge circuit of the flexible display device according to embodiments of the present disclosure.

FIG. 10A is a view illustrating a flexible display device 1000 according to one or more embodiments of the present disclosure, FIG. 10B illustrates the relationship between tension and compression in the bending region of the flexible display device 1000, and FIG. 11 is a view showing a bridge circuit 1010 of the flexible display device 1000 according to embodiments of the present disclosure.

In the flexible display device 1000, two bending sensors (strain gauges) 601*a*, 601*b* are mounted in one side of the bending region 602 shown in FIG. 6. Alternatively, one bending sensor (strain gauge) may be mounted in each side of the bending region 602. In this case, both the bending sensors 601*a*, 601*b* are mounted in the second film U2, which is tensioned, as described with reference to FIG. 10B.

In the flexible display device 1000, a bridge circuit 1010 includes two bending sensors (strain gauges) 601*a*, 601*b* and two reference resistors R2 and R3, as shown in FIG. 11.

That is, two bending sensors (strain gauges) 601*a*, 601*b* mounted in the second film U2, which is tensioned, as described with reference to FIG. 10, correspond to R1 and R4, respectively, shown in FIG. 11.

In the case in which the bridge circuit 1010 is configured as shown in FIG. 11, the voltage value V$_{AB}$ between the terminals A and B is as represented in [Equation 1].

$$V_{AB}=[R3/(R1+R3)-R4/(R2+R4)]\times Vs$$

R1 and R4 are bending sensors (i.e., bending sensors 601a, 601b, respectively) for sensing tensile strain, and therefore the resistances of R1 and R4 are increased. Consequently, the output voltage of the bridge circuit 1010 according to embodiments of the present disclosure is equivalent to twice that of the conventional bridge circuit shown in FIG. 3A.

In the bridge circuit 1010 of FIG. 11, the bending sensors 601a, 601b may be reversed with respect to the position of the resistors, such that the two bending sensors (strain gauges) 601a, 601b mounted in the second film U2, which is tensioned, may be constituted by R2 and R3.

That is, the resistances of the resistors R2 and R3 vary (i.e., when the bending sensors 601a, 601b are provided as the resistors R2, R3, respectively), and therefore Equation 1 is represented as follows: $V_{AB}=[R3/(R1+R3)-R4/(R2+R4)]\times Vs$. Consequently, the output voltage of the bridge circuit according to the present disclosure is equivalent to twice that of the conventional bridge circuit shown in FIG. 3A.

Although not shown, in the bridge circuit 1010 of the flexible display device 1000 according to another embodiment of the present disclosure, the two bending sensors (strain gauges) 601a, 601b may be mounted in the third film U3, which is compressed, as described with reference to FIG. 10.

That is, even in the case in which the two bending sensors (strain gauges) 601a, 601b are mounted in the third film U3, which is compressed, the bridge circuit 1010 may be configured as shown in FIG. 11. In the bridge circuit 1010 of FIG. 11, the two bending sensors (strain gauges) 601a, 601b mounted in the third film U3, which is compressed, may be constituted by R2 and R3.

Figure 12A:
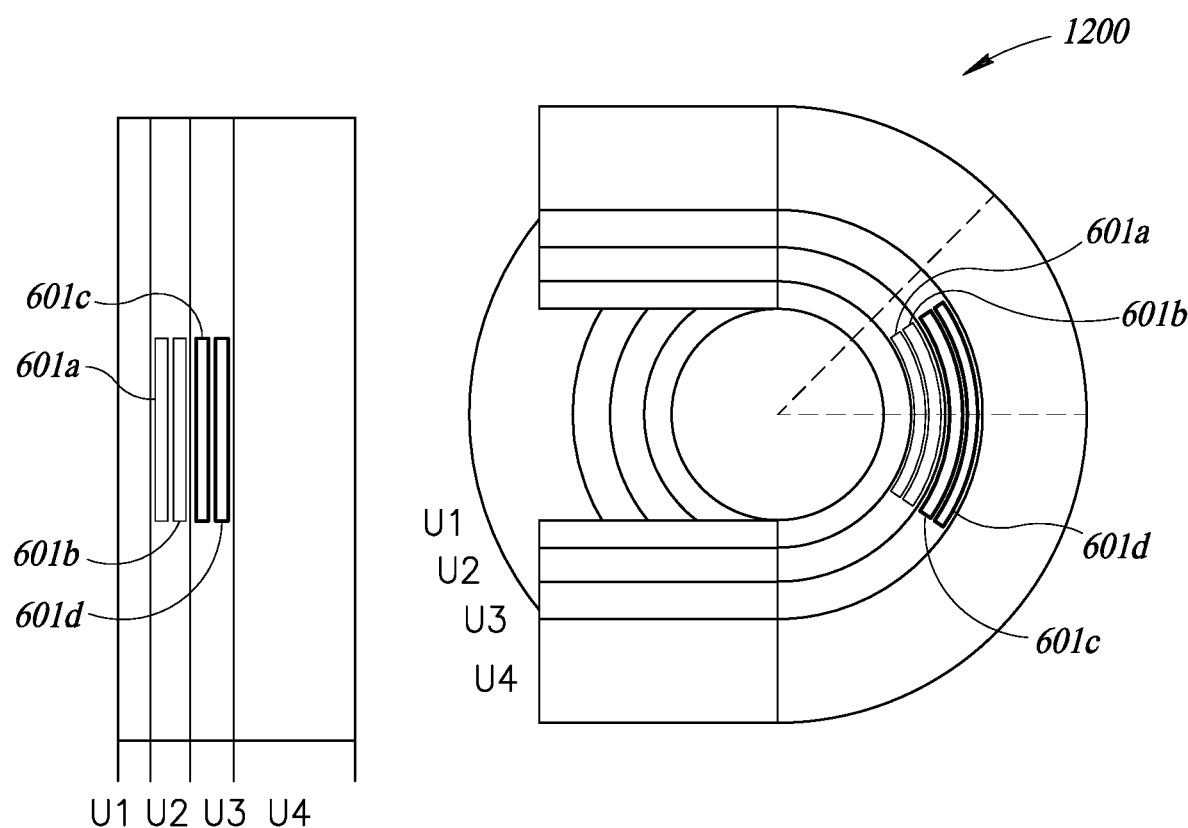
FIG. 12A is a view illustrating bending of a flexible display device according to embodiments of the present disclosure.
Figure 12B:
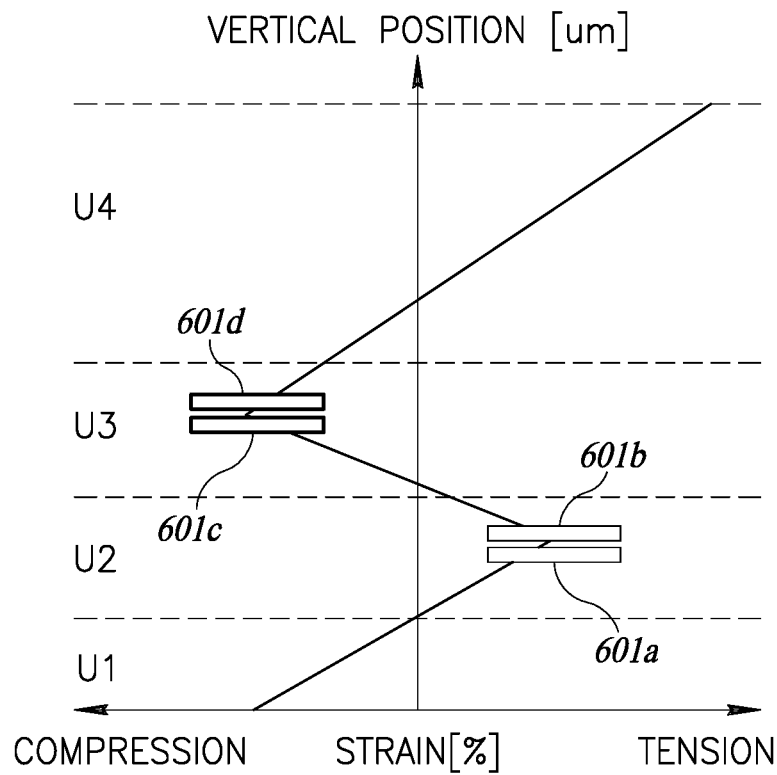
FIG. 12B is a plot illustrating the relationship between tension and compression in the layers of the flexible display device of FIG. 12A.
Figure 13:
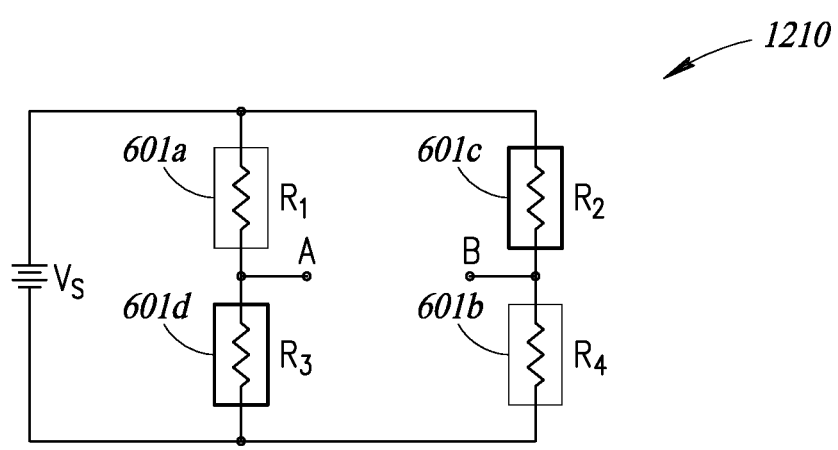
FIG. 13 is a view showing the construction of a bridge circuit of the flexible display device according to embodiments of the present disclosure.

FIG. 12A is a view illustrating a flexible display device 1200 according to one or more embodiments of the present disclosure, FIG. 12B illustrates the relationship between tension and compression in the bending region of the flexible display device 1200, and FIG. 13 is a view showing a bridge circuit 1210 of the flexible display device 1200 according to embodiments of the present disclosure.

In the flexible display device 1200, two bending sensors (strain gauges) are mounted in each side of the bending region 602, as described with reference to FIG. 6. As shown in FIG. 12, two of the bending sensors 601c, 601d are mounted in the third film U3, which is compressed, and the other two bending sensors 601a, 601b are mounted in the second film U2, which is tensioned.

In the flexible display device 1200, a bridge circuit 1210 includes four bending sensors (strain gauges) 601a to 601d, as shown in FIG. 13. Two bending sensors (strain gauges) 601c, 601d mounted in the third film U3, which is compressed, correspond to R2 and R3 shown in FIG. 13, and two bending sensors (strain gauges) 601a, 601b mounted in the second film U2, which is tensioned, correspond to R1 and R4 shown in FIG. 13.

In the case in which the bridge circuit 1210 is configured as shown in FIG. 13, the voltage value $V_{AB}$ between the terminals A and B is as represented in [Equation 1].

$$V_{AB}=[R3/(R1+R3)-R4/(R2+R4)]\times Vs$$

R1 and R4 are bending sensors (i.e., bending sensors 601a, 601b, respectively) for sensing tensile strain, and therefore the resistances of R1 and R4 are increased. R2 and R3 are bending sensors (i.e., bending sensors 601c, 601d, respectively) for sensing compressive strain, and therefore the resistances of R2 and R3 are decreased. Consequently, the output voltage of the bridge circuit 1210 according to embodiments of the present disclosure is equivalent to four times that of the conventional bridge circuit shown in FIG. 3A.

In the bridge circuit 1210 of FIG. 13, the bending sensors 601a, 601b may be reversed with respect to the position of the bending sensors 601c, 601d, such that the two bending sensors (strain gauges) constituted by R2 and R3 may be mounted in the second film U2, which is tensioned, and the two bending sensors (strain gauges) constituted by R1 and R4 may be mounted in the third film U3, which is compressed.

That is, the bending sensors for sensing tensile strain and the bending sensors for sensing compressive strain may be changed to correlative resistors, and the positions of the resistors may be changed symmetrically.

In each of the embodiments of the present disclosure described above, a bending sensor and a routing line for outputting a signal detected by the bending sensor may be formed of a conductive material used in a process of forming a film (layer), in which the bending sensor will be mounted.

For example, assuming that a film (layer) that is compressed is a pixel array layer (TFT+Encap) and a film (layer) that is tensioned is a touch sensor layer (Touch), a bending sensor and a routing line may be formed of a material used to form a gate electrode, a data electrode, a scan line, and a data line of a transistor constituting a pixel array, or a bending sensor and a routing line may be formed of a material used to form an X-axis electrode and a Y-axis electrode for sensing touch and the routing line.

Hereinafter, the output voltages of the bridge circuits according to embodiments of the present disclosure will be compared with those of the conventional bridge circuit shown in FIG. 3A in detail.

Figure 1:
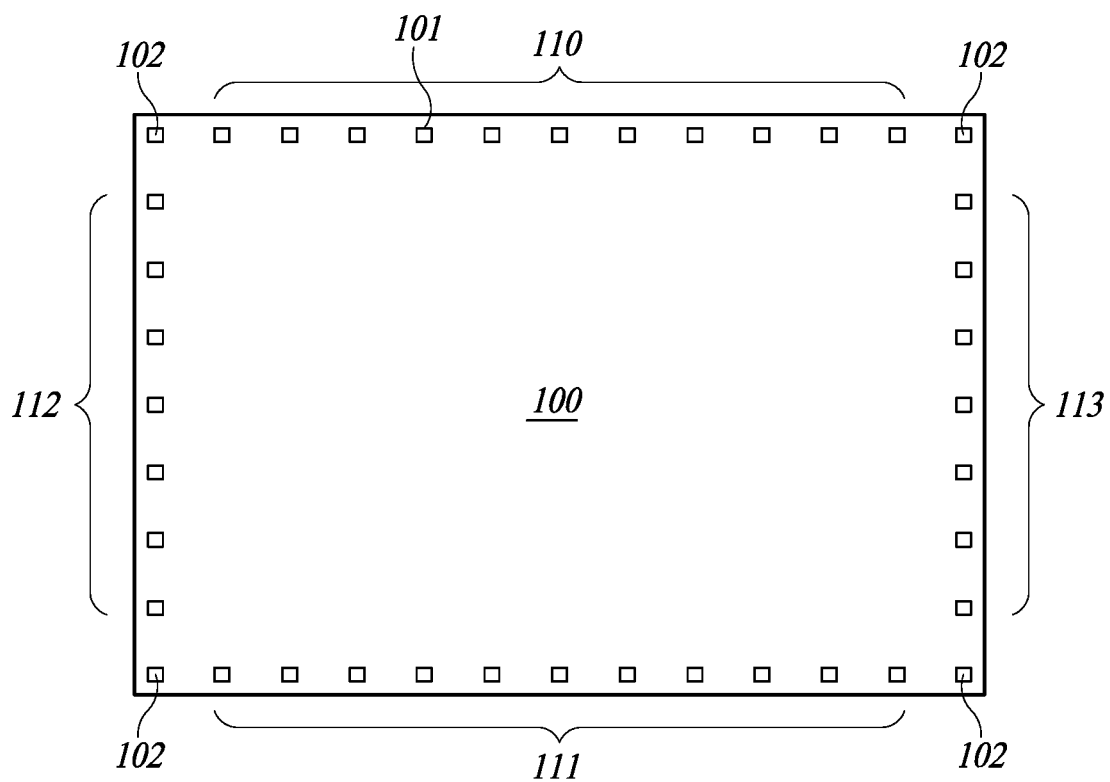
FIG. 1 is a view showing a conventional flexible display device in which a plurality of bending sensors are disposed.
Figure 2:
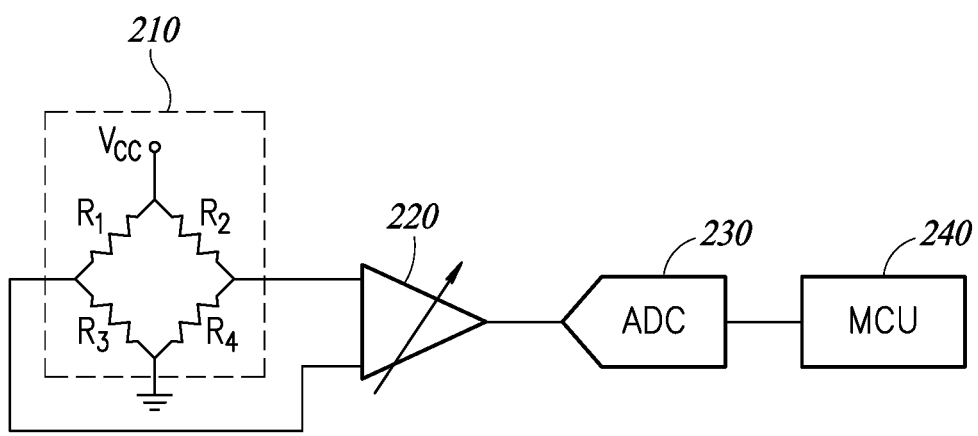
FIG. 2 is a view showing the construction of a conventional measurement unit.
Figure 3A:
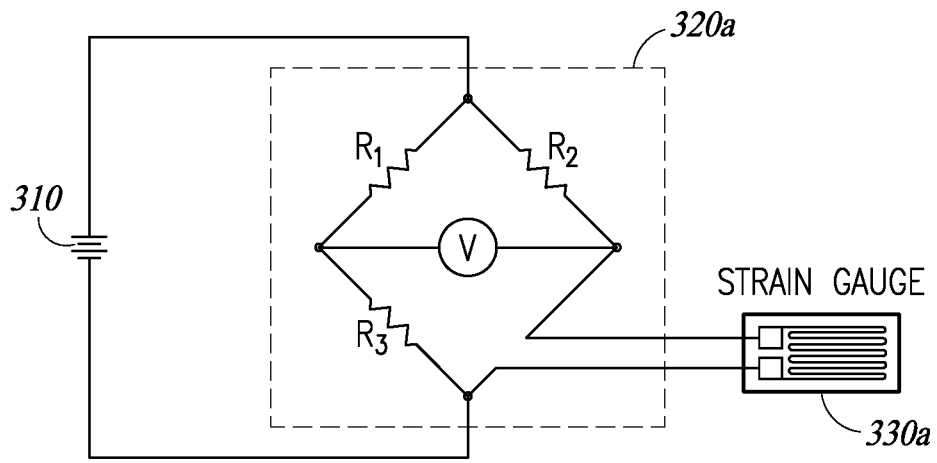
Figure 3B:
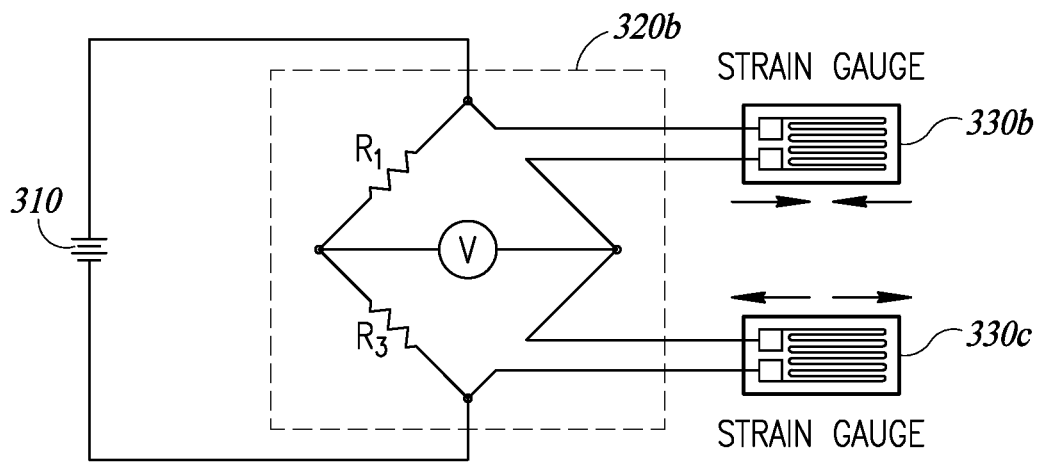
Figure 4:
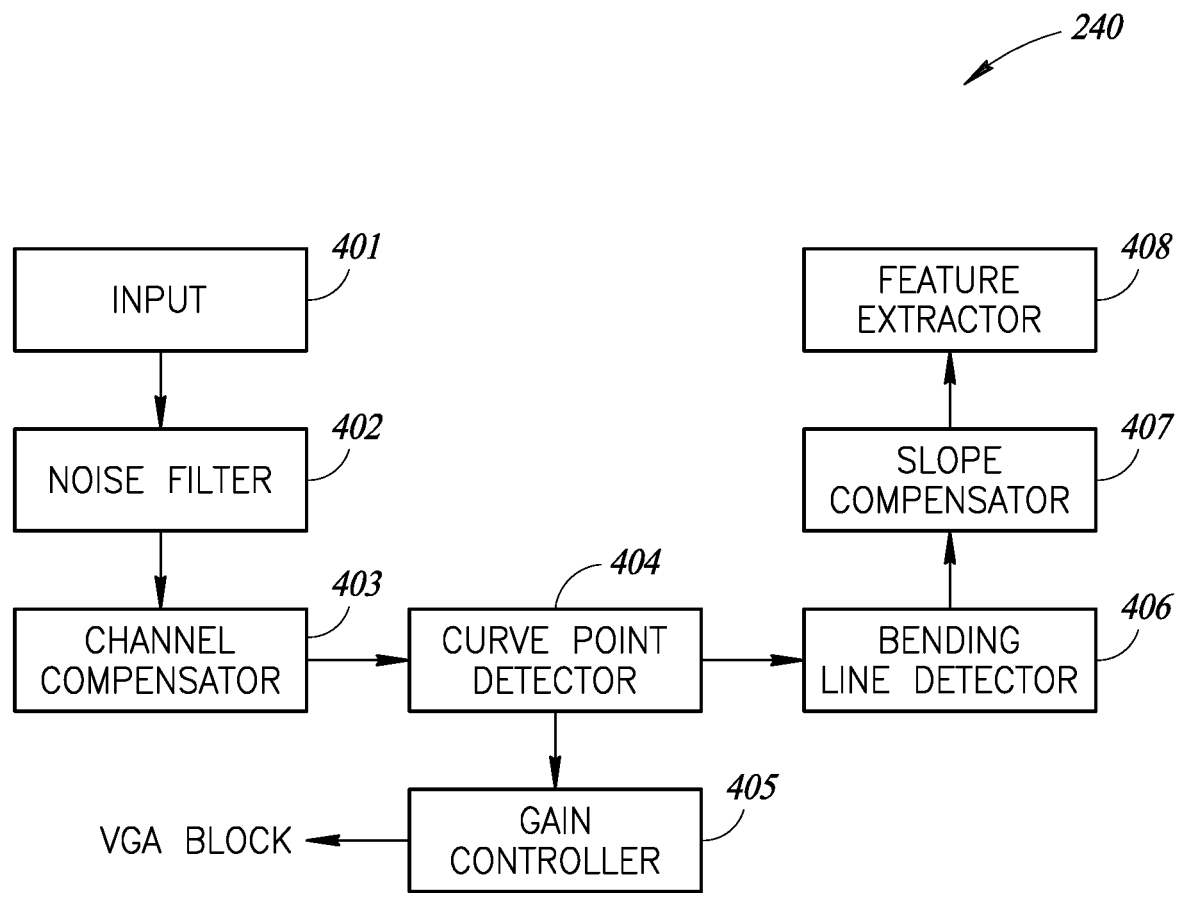
FIG. 4 is a block diagram showing the detailed construction of a microprocessor (MCU) of FIG. 2.
Figure 14A:
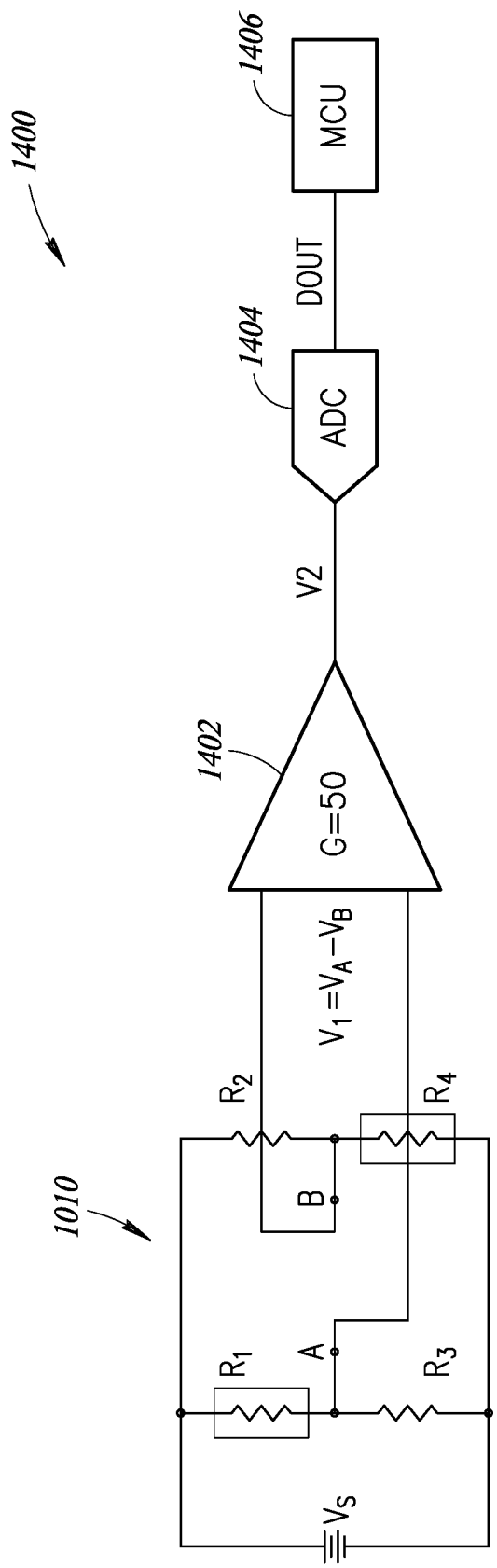
FIG. 14(a) is a view showing a circuit for measuring output voltages of the bridge circuit of the flexible display device shown in FIG. 11.

FIG. 14(a) is a view showing a circuit 1400 for measuring output voltages of the bridge circuit 1010 of the flexible display device 1000 according to embodiments of the present disclosure shown in FIG. 11, FIG. 14(b) is a table showing resistance variations and output voltages of resistors depending on bending angles when the conventional bridge circuit of FIG. 3A is used, and FIG. 14(c) is a table showing resistance variations and output voltages of resistors depending on bending angles measured using the circuit 1400 as shown in FIG. 14(a).

In FIG. 14(a), R1 and R4 indicate first and second bending sensors (strain gauge) (e.g., the bending sensors 601a, 601b, respectively, as shown in FIG. 11). The circuit 1400 further includes an amplifier 1402, an analog-to-digital converter 1404 and a microprocessor (MCU) 1406.

As shown in the table of FIG. 14(b), the output voltage variation of the bridge circuit shown in FIG. 3A, amplified by the amplifier, depending on the resistance variation of the bending sensor (strain gauge) within a bending angle range of −180 degrees to 180 degrees is 1.93 V (from −0.96 V to 0.97 V), whereas the output voltage variation of the bridge circuit 1010, described with reference to FIG. 11, is 3.85 V (from −1.91 V to 1.94 V). Consequently, it can be seen that the output voltage variation of the bridge circuit 1010 according to embodiments of the present disclosure is equivalent to twice that of the conventional bridge circuit.

In addition, the output of the analog to digital converter 230 in the conventional bridge circuit shown in FIG. 3A is 394, whereas the output of the analog to digital converter 1404 of the bridge circuit 1010 shown in FIG. 11 is 789. As a result, the bridge circuit 1010 according to embodiments of the present disclosure exhibits a higher signal-to-noise ratio (SNR) than the conventional bridge circuit, thereby improving reliability in sensing the bending of the flexible display device.

Figure 15A:
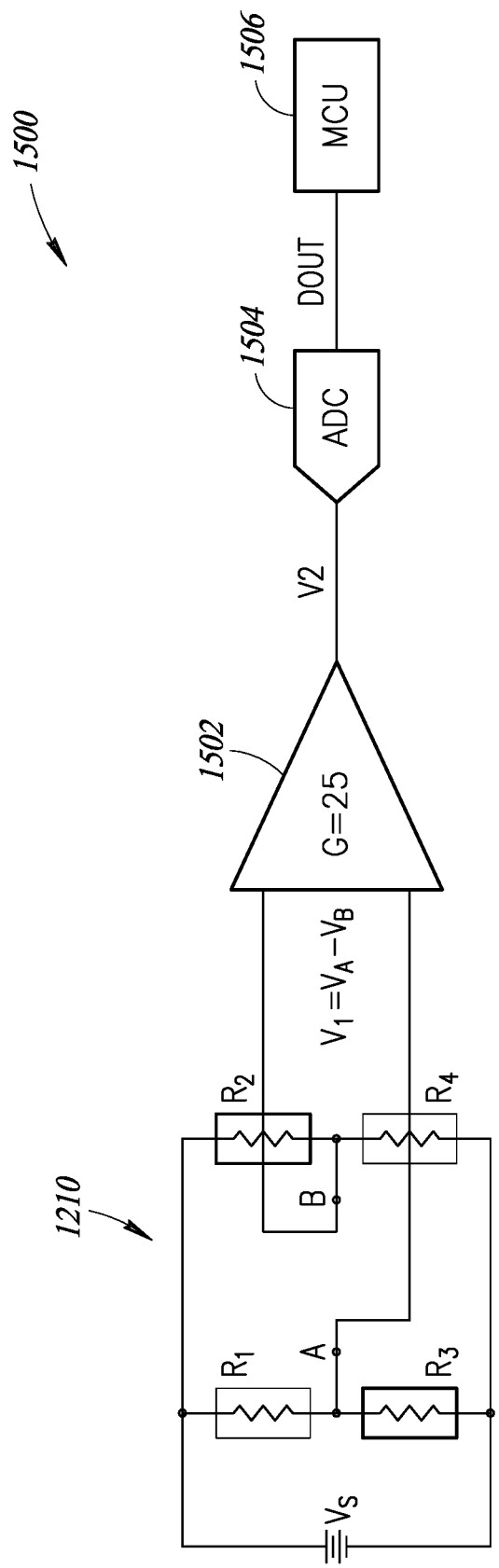
FIG. 15(a) is a view showing a circuit for measuring output voltages of the bridge circuit of the flexible display device shown in FIG. 13.

FIG. 15(a) is a view showing a circuit 1500 for measuring output voltages of the bridge circuit 1210 of the flexible display device 1200 according to embodiments of the present disclosure shown in FIG. 13, FIG. 15(b) is a table showing resistance variations and output voltages of resistors depending on bending angles when the conventional bridge circuit of FIG. 3A is used, and FIG. 15(c) is a table showing resistance variations and output voltages of resistors depending on bending angles measured using the circuit 1500 as shown in FIG. 15(a).

In FIG. 15(a), R1 to R4 indicate first through fourth bending sensors (strain gauge) (e.g., the bending sensors 601a to 601d, respectively, as shown in FIG. 13). The circuit 1500 further includes an amplifier 1502, an analog-to-digital converter 1504 and a microprocessor (MCU) 1506.

As shown in the table of FIG. 15(b), the output voltage variation of the bridge circuit shown in FIG. 3A, amplified by the amplifier, depending on the resistance variation of the bending sensor (strain gauge) within a bending angle range of −180 degrees to 180 degrees is 1.93 V (from −0.96 V to 0.97 V), whereas the output voltage variation of the bridge circuit 1210, described with reference to FIG. 13, is 3.85 V (from −1.91 V to 1.94 V). However, the gain of the amplifier 1402 shown in FIG. 14 is 50, whereas the gain of the amplifier 1502 shown in FIG. 15 is 25. Consequently, it can be seen that the output voltage variation of the bridge circuit 1210 according to embodiments of the present disclosure is equivalent to four times that of the conventional bridge circuit.

As a result, the bridge circuit 1210 according to embodiments of the present disclosure exhibits a higher SNR than the conventional bridge circuit, thereby improving reliability in sensing the bending of the flexible display device.

As is apparent from the above description, the flexible display device according to the present disclosure has the following effects.

First, a small resistance variation sensed by the bending sensor is converted into a large output voltage value. Consequently, a signal-to-noise ratio (SNR) is improved, thereby improving bending angle sensing performance.

Second, a half-bridge circuit is configured in order to increase output voltage even in the environment in which the flexible display device is deformed in the same direction.

Third, the bending sensors are mounted in a region of the flexible display device that is tensioned and in a region of the flexible display device that is compressed. Consequently, it is possible to accurately measure stress and strain in layers of the flexible display device, whereby it is possible to estimate deterioration of the flexible display device over time and depending on environments.

Fourth, since the bending sensor is mounted in the flexible display device, which includes a plurality of films (layers), the bending sensor and a routing line for outputting a signal detected by the bending sensor may be formed of a conductive material used in a process of forming a film (layer), in which the bending sensor will be mounted. Consequently, no additional process is required, and manufacturing costs are reduced.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A flexible display device, comprising:
a pixel array layer including a scan line, a data line, and a transistor;
a touch sensor layer on the pixel array layer, the touch sensor layer including a plurality of touch sensing electrodes;
a cover plate layer on the touch sensor layer, the touch sensor layer disposed between the pixel array layer and the cover plate layer; and
first and second bend sensors embedded in at least one of a first layer that is tensioned or a second layer that is compressed when the flexible display device is bent, the first layer being one of the pixel array layer or the touch sensor layer, the second layer being a different one of the pixel array layer or the touch sensor layer, at least one of the first bend sensor or the second bend sensor being formed of a same material as at least one of the scan line, the data line, or an electrode of the transistor.

2. The flexible display device according to claim 1, wherein the first bend sensor is positioned in the first layer, and the second bend sensor is positioned in the second layer.

3. The flexible display device according to claim 2, further comprising:
a bridge circuit including:
a first branch, in which the first bend sensor and a first resistor are coupled to each other in series, the first branch including a first output terminal positioned between the first bend sensor and the first resistor, and
a second branch, in which the second bend sensor and a second resistor are coupled to each other in series, the second branch including a second output terminal positioned between the second bend sensor and the second resistor, the first and second branches being coupled to a power source in parallel with respect to each other.

4. The flexible display device according to claim 2, further comprising:
a bridge circuit including:
a first branch, in which the first and second bend sensors are coupled to each other in series, the first branch including a first output terminal positioned between the first and second bend sensors, and
a second branch, in which a first resistor and a second resistor are coupled to each other in series, the second branch including a second output terminal positioned between the first and second resistors, the first and second branches being coupled to a power source in parallel with respect to each other.

5. The flexible display device according to claim 2, further comprising:
a bridge circuit including:
a first branch, in which first and second resistors are coupled to each other in series, the first branch including a first output terminal positioned between the first and second resistors, and
a second branch, in which the first and second bend sensors are coupled to each other in series, the second branch including a second output terminal positioned between the first and second bend sensors, the first and second branches being coupled to a power source in parallel with respect to each other.

6. The flexible display device according to claim 1, wherein the first and second bend sensors are positioned in the first layer that is tensioned when the flexible display device is bent.

7. The flexible display device according to claim 6, further comprising:
a bridge circuit including:
a first branch, in which the first bend sensor and a first resistor are coupled to each other in series, the first branch including a first output terminal positioned between the first bend sensor and the first resistor, and
a second branch, in which the second bend sensor and a second resistor are coupled to each other in series, the first and second branches being coupled to a power source in parallel with respect to each other, the first bend sensor being coupled between the first output terminal and a first power source terminal, the second bend sensor being coupled between the second output terminal and a second power source terminal.

8. The flexible display device according to claim 1, wherein the first and second bend sensors are positioned in the second layer that is compressed when the flexible display device is bent.

9. The flexible display device according to claim 8, further comprising:
a bridge circuit including:
a first branch, in which the first bend sensor and a first resistor are coupled to each other in series, the first branch including a first output terminal positioned between the first bend sensor and the first resistor, and
a second branch, in which the second bend sensor and a second resistor are coupled to each other in series, the first and second branches being coupled to a power source in parallel with respect to each other, the first bend sensor being coupled between the first output terminal and a first power source terminal, the second bend sensor being coupled between the second output terminal and a second power source terminal.

10. The flexible display device according to claim 1, further comprising:
third and fourth bend sensors, wherein the first and second bend sensors are positioned in the first layer that is tensioned when the flexible display device is bent, and the third and fourth bend sensors are positioned in the second layer that is compressed when the flexible display device is bent.

11. The flexible display device according to claim 10, further comprising:
a bridge circuit including:
a first branch, in which the first and third bend sensors are coupled to each other in series, the first branch including a first output terminal positioned between the first and third bend sensors, and
a second branch, in which the second and fourth bend sensors are coupled to each other in series, the first and second branches being coupled to a power source in parallel with respect to each other.

12. A flexible display device, comprising:
a first layer including one of a pixel array layer or a touch sensor layer, the touch sensor layer including a plurality of touch sensing electrodes, the pixel array layer including a scan line, a data line, and a transistor;
a second layer on the first layer, the second layer including a different one of the pixel array layer or the touch sensor layer;
a first bend sensor formed in the first layer;
a second bend sensor formed in the second layer;
a bridge circuit including first and second branches coupled to a power source in parallel with respect to each other, the first and second branches including respective first and second output terminals, the first and second bend sensors being provided in at least one of the first and second branches; and
an amplifier having a first input terminal coupled to the first output terminal of the bridge circuit, and a second input terminal coupled to the second output terminal of the bridge circuit, the amplifier being configured to amplify a voltage difference between the first and second output terminals of the bridge circuit in response to bending the flexible display device,
wherein at least one of the first bend sensor or the second bend sensor is formed of a same material as at least one of the scan line, the data line, or an electrode of the transistor.

13. The display device of claim 12, further comprising:
an analog-to-digital converter coupled to an output of the amplifier and configured to receive an amplified signal provided at the amplifier output; and
a microprocessor coupled to an output of the analog-to-digital converter.

14. The display device of claim 12, wherein the first layer is tensioned and the second layer is compressed in response to bending the flexible display device in a first direction, and the first layer is compressed and the second layer is tensioned in response to bending the flexible display device in a second direction opposite the first direction.

15. The display device of claim 12, wherein the first branch includes a first resistor coupled in series to the first bend sensor, the first output terminal being positioned between the first bend sensor and the first resistor, and the second branch includes a second resistor coupled in series to the second bend sensor, the second output terminal being positioned between the second bend sensor and the second resistor.

16. The display device of claim 12, wherein the first branch includes the first bend sensor coupled in series to the second bend sensor, the first output terminal being positioned between the first and second bend sensors, and the second branch includes a first resistor coupled in series to a second resistor, the second output terminal being positioned between the first and second bend resistors.

17. The display device of claim 12, further comprising:
a third bend sensor formed in the first layer; and
a fourth bend sensor formed in the second layer,
wherein the first branch includes the first bend sensor coupled in series to the second bend sensor, the first output terminal being positioned between the first and second bend sensors, and the second branch includes the third bend sensor coupled in series to the fourth bend sensor, the second output terminal being positioned between the third and fourth bend sensors.

18. A flexible display device having a bending region, the flexible display device comprising:
a pixel array layer, at least a portion of the pixel array layer being positioned in the bending region, the pixel array layer including a scan line, a data line, and a transistor;

a touch sensor layer on the pixel array layer, at least a portion of the touch sensor layer being positioned in the bending region, the touch sensor layer including a touch sensor electrode;

a first bend sensor embedded in the pixel array layer in the bending region, the first bend sensor formed of a same material as at least one of the scan line, the data line or an electrode of the transistor; and a second bend sensor embedded in the touch sensor layer in the bending region, the second bend sensor formed of a same material as the touch sensor electrode, wherein one of the pixel array layer or the touch sensor layer is tensioned when the flexible display device is bent in the bending region, and the other of the pixel array layer or the touch sensor layer is compressed when the flexible display device is bent in the bending region.

19. The flexible display device of claim 18, wherein the first and second bend sensors are positioned outside of a display area of the flexible display device.

20. The flexible display device of claim 18, further comprising:

a third bend sensor embedded in the pixel array layer in the bending region; and a fourth bend sensor embedded in the touch sensor layer in the bending region.

21. The flexible display device of claim 18, wherein the pixel array layer directly contacts the touch sensor layer.

22. The flexible display device of claim 18, wherein the flexible display device has a display area and the bending region extending through the display area, wherein an entirety of the first bend sensor is positioned outside of and spaced apart from the display area, and wherein an entirety of the second bend sensor is positioned outside of and spaced apart from the display area.

\* \* \* \* \*